United States Patent Office 3,232,743
Patented Feb. 1, 1966

3,232,743
METHOD OF AGGLOMERATING MAGNESIUM-SILICATE NICKEL ORES
Hannes Anna, Oelde, Westphalia, Germany, assignor to Polysius G.m.b.H., Neubeckum, Germany
No Drawing. Filed Sept. 4, 1964, Ser. No. 394,627
Claims priority, application Germany, Sept. 16, 1963, P 32,592
10 Claims. (Cl. 75—1)

This invention generally relates to nickel ore processing and is particularly directed to a method of agglomerating magnesium-silicate nickel ores by the thermal consolidation of fine ores which in consolidated form may then be submitted to a reducing treatment for the recovery of nickel.

The term "magnesium-silicate nickel ores" as used herein is deemed to refer to garnierite proper and all other nickel ores which in their genesis are similar to garnierite. The term therefore includes ores which have been formed or are being formed by efflorescence or disintegration of ultra basic nickel-containing rock formations, e.g. peridotites, and which contain the nickel component in silicate form.

Shaft furnaces are generally used for the recovery of nickel. Since the performance of the furnace substantially depends upon the capability of a gas to pass through the charge, the bed of material should remain pervious to gas for as long a period as possible. A maximum possible surface area for the reduction of the material is also desirable. Finally, the NiO content of the discharged slag should be minimal.

At present, the usual feed for smelting nickel in a shaft furnace is a lump feed produced by sintering a crude ore, such as garnierite. Generally this raw material contains about 5% of NiO, about 20% overall of iron, about 15 to 30% of MgO, about 40 to 50% of $SiO_2$ and 10 to 15% of water of hydration. Sintering produces a coarsely porous sinter, partly reduced to metallic iron, with a large proportion of vitrified material. The heat requirements are about 1000 kcal. per kg. of sinter and are thus very high.

With respect to its mineral composition, the sinter primarily contains olivine mixed crystals as well as enstatite, but only traces of magnetite. Microscopic examination and glass determination reveal the presence of a large proportion of glass. The total iron component is found to be in the glass and in the olivine mixed crystals in the form of fayalite.

The rapid heating to high temperatures on a movable sinter grate or band causes a complete conversion of hematite and magnetite into the bivalent iron components forming the low melting fayalite which, together with the forsterite, represents the olivine mixed crystals.

If a sinter thus obtained on a movable sinter grate is charged into a shaft furnace then the permeability to gas of the charge deteriorates and becomes non-uniform when the temperature is still low and the period of dwell in the furnace has been only short. The olivine mixed crystals, which have been pre-formed on the sinter grate, and the glass moiety fuse or melt at an early stage without a transitional stage and thereby destroy the internal pore space which had been very small from the beginning.

Moreover, the solution equilibrium of the nickel oxide in the melt which had already been promoted during the sintering is further accelerated by the early fusion or melting in the furnace. This leads to the retention of a relatively high NiO content in the slag so that the latter must be recycled to the furnace.

Another drawback of the prior art procedure is its generally difficult reducibility during the smelting process, due particularly to its high FeO content.

An object of the present invention is therefore to provide a feed by consolidating magnesium silicate nickel ores, which when used to form a bed in a blast or shaft furnace will remain evenly pervious to gas for a long time, which will have a large internal pore space and hence a large surface area for reduction, which will have a very low content of FeO and hence be readily reducible, and which will produce a slag containing very little NiO.

Generally it is an object of this invention to improve nickel ore processing procedures as presently practiced.

According to the invention there is provided a method of agglomerating a magnesium silicate nickel ore to render it suitable for submission to a reducing process for the recovery of nickel, wherein the ore in fine-grained form is pelletized and the pellets are heated by gradually raising the temperature for a period sufficiently long for the iron contained in the ore to be preserved in its trivalent form and to recrystallize—at least partly together with bivalent oxides—in the form of coarse inclusions in a magnesium silicate matrix which forms a rigid basic structure in each pellet.

The heating of the green pellets must therefore be slow enough to prevent the content of trivalent iron from being converted to fayalite through the intermediate magnetite stage, since otherwise the low melting olivine mixed crystal with a considerable fayalite component would form. The present method permits the FeO content to be successfully reduced to less than 1%.

Owing to the slow heating process and the resultant long period of dwell, the iron content which is in the trivalent form above about 800° C. collectively crystallizes. The iron which was previously homogeneously distributed forms well developed idiomorphic crystals in the magnesium silicate matrix which is partly of forsteritic, partly of enstatitic nature, and, after a prolonged period of dwell, these crystals are transformed to spinels, particularly to $Fe_2O_3.MgO$ and $Fe_2O_3.NiO$. The accumulation of NiO in the spinel phase and its reduction in the magnesium silicate matrix can be clearly shown to have occurred by performing a gravity separation and then submitting the separated spinels to radiographic examination.

The magnesium silicate matrix, which does not readily recrystallize because of its high fusing point, forms a good bond during the long period of dwell, imparting excellent mechanical strength to the pellet. Since the iron component has completely migrated out of the matrix and developed in coarse crystalline form as a spinel, the substantially iron-free magnesium silicate matrix has a high melting point and hence good refractory properties.

When pellets produced by the present method are charged into a smelting furnace, this refractory matrix forms a structure in the pellet, which is capable of preserving the original porosity as well as the pellet shape much longer during the smelting process and at much higher temperatures than is the case when smelting a conventional sinter. Contrary to what occurs in conventional machine sinter, the softening process when using pellets produced by the present method is not an abrupt fusion but a gradually progressive deformation. Hence the good and even permeability to gas of the pellet bed as well as the large internal pore surface of each pellet facilitating reduction during the smelting process are preserved for a long time, and this leads to a substantial improvement in the performance of the furnace.

Another advantage of the pellets produced by the present method is that during the process of smelting a substantially lower content of NiO appears in the slag than is the case when normal machine sinter is fed into the furnace. This is due to the retardation and delay in the development of the fusion phase.

Another useful feature is the high reducibility due to the low FeO content. The pellets produced by the present method also exhibit excellent resistance to pressure and abrasion, a factor which reduces the volume of dust discharged by the furnace.

The improved permeability to gas of the pellet bed, the better reducibility of the material, the possibility of doing without a return of the slag and the reduced evolution of dust substantially lower the specific consumption of electrical power and the consumption of fluxes while on the other hand raising the throughput through the furnace.

The present method may for instance be performed by forming pellets from fine nickel ore and water in a granulating device, charging the pellets into a Lepol kiln or the like rotary furnace and consolidating them by burning at a temperature of 1280 to 1340° C., their period of residence in the rotary kiln being from 2½ to 3 hours. Generally speaking, the upper heating temperature should advantageously not exceed 1370–1380° C. as higher temperatures may negatively affect the pellet structure. While the heating period has been indicated as between 2.5 to 3 hours, good results may in some instances be obtained with shorter treatment periods such as 1.5 hours. The longer the pellets stay in the rotary kiln, the better their quality.

The mesh size of the starting ore also influences the FeO content and the desired porosity of the pellets. The finer the particle size, the lower the FeO content and the greater the porosity in the treated product.

Since the MgO and $Fe_2O_3$ contents of the ore may fluctuate it would be necessary to raise the burning temperature to produce pellets of the same strength when the MgO content is high. However, since this is not advisable because the $Fe_2O_3$ would then begin to decompose, it is better in such cases to increase the proportion of the finest material as this will then lead to an improvement in strength without raising the temperature beyond the specified range.

The invention will now be described by an example, it being understood that this example is being given by way of illustration and not by way of limitation.

*Example I*

Garnierite in fine-grain form was formed into pellets with water. The composition of the garnierite was about as follows: $NiO=5\%$; total iron$=20\%$; $MgO=20\%$; $SiO_2=45\%$; water of hydration$=10\%$. The pellets were gradually heated to about 1350° C. during about 3 hours.

While a specific embodiment of the invention has been shown and described in detail to illustrate the application of the inventive principles, it will be understood that the invention may be embodied without otherwise departing from such principles.

The preferred mesh size for the ore to be pelletized is between 6 and 20 percent residue on a screen with 4900 meshes per sq. cm.

What is claimed is:

1. A method of agglomerating iron-containing magnesium-silicate nickel ore of fine particle size which comprises forming the ore into pellets and slowly heating the pellets to a high temperature below their melting point for a period sufficient to preserve at least a major proportion of the iron in the ore in its trivalent form and to cause its recrystallization, at least partly with bivalent oxides, in the form of coarse inclusions in a magnesium silicate matrix which forms a rigid structure in each pellet.

2. A method as claimed in claim 1, wherein the pellets are formed by mixing the ore with water.

3. A method as claimed in claim 1, wherein the pellets are rotated during the heating.

4. A method as claimed in claim 1, wherein the pellets are heated to a temperature of about between 1280–1380° C.

5. A method as claimed in claim 1, wherein the pellets are heated to a temperature of about between 1280–1380° C. for a period of about between 1.5–3 hours.

6. A method of agglomerating magnesium-silicate nickel ore of fine particle size, which comprises forming the ore into pellets and slowly heating the pellets in a rotary furnace to between about 1280–1380° C. for a period not exceeding about 3 hours.

7. A method as claimed in claim 6, wherein the pellets are heated for about between 1.5–3 hours.

8. A method of agglomerating an iron-containing magnesium silicate nickel ore to render it suitable for submission to a reducing process for the recovery of nickel, which comprises forming pellets of the ore in fine-grained form and heating the pellets by gradually raising the temperature for a period sufficiently long for the iron contained in the ore to be preserved in its trivalent form and to recrystallize, at least partly together with bivalent oxides, in the form of coarse inclusions in a magnesium silicate matrix which forms a rigid basic structure in each pellet.

9. A method as claimed in claim 8, wherein the pellets are heated in a rotary kiln.

10. A method as claimed in claim 9, wherein the pellets are heated to a temperature of 1280 to 1380° C. for a period of about 1.5 to 3 hours.

No references cited.

DAVID L. RECK, *Primary Examiner.*